United States Patent
Chen

(10) Patent No.: US 10,193,450 B2
(45) Date of Patent: Jan. 29, 2019

(54) AC-DC VOLTAGE CONVERTER WITH LOW STANDBY POWER CONSUMPTION AND CONTROL METHOD THEREOF

(71) Applicant: Silergy Semiconductor Technology (Hangzhou) LTD, Hangzhou, ZheJiang Province (CN)

(72) Inventor: Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 43 days.

(21) Appl. No.: 15/088,331

(22) Filed: Apr. 1, 2016

(65) Prior Publication Data

US 2016/0218629 A1    Jul. 28, 2016

Related U.S. Application Data

(63) Continuation of application No. 13/950,976, filed on Jul. 25, 2013, now Pat. No. 9,331,581.

(30) Foreign Application Priority Data

Aug. 28, 2012   (CN) .......................... 2012 1 0309980

(51) Int. Cl.
*H02M 3/335* (2006.01)
*H02M 1/12* (2006.01)
(Continued)

(52) U.S. Cl.
CPC ......... *H02M 3/33507* (2013.01); *H02M 1/08* (2013.01); *H02M 1/126* (2013.01);
(Continued)

(58) Field of Classification Search
CPC ......... H02M 3/33507; H02M 3/33523; H02M 3/335; H02M 3/33569; H02M 3/33561; H02M 3/33592; H02M 1/32; H02M 1/34; H02M 1/4208; H02M 2001/0032; H02M 7/062; H02M 7/066; H02M 7/06; H02M 7/217; H02M 7/219; H02M 7/155; H02M 7/043
(Continued)

(56) References Cited

U.S. PATENT DOCUMENTS 4,752,865 A    6/1988   Hatakeyama
7,852,645 B2   12/2010  Fouquet et al.
(Continued)

*Primary Examiner* — Kyle J Moody
*Assistant Examiner* — Kevin H Sprenger
(74) *Attorney, Agent, or Firm* — Michael C. Stephens, Jr.

(57) ABSTRACT

Disclosed are AC-DC voltage converter circuits and methods for low standby power consumption. In one embodiment, a method can include: (i) detecting operating states of an input power supply, where the input power supply is received by a safety capacitor and provided to a switching power supply circuit after being rectified and filtered; (ii) removing a phantom load when the input power supply operates in a normal operating state; (iii) loading the phantom load when the input power supply operates in an under voltage lock out state; and (iv) when the input power supply operates in the under voltage lock out state, using energy stored in the safety capacitor to supply power to a load of the switching power supply circuit and the phantom load, and disabling a power stage circuit until a voltage of the safety capacitor is reduced to less than a safety threshold value.

20 Claims, 5 Drawing Sheets

(51) Int. Cl.
  *H02M 1/08*   (2006.01)
  *H02M 1/32*   (2007.01)
  *H02M 1/00*   (2006.01)

(52) U.S. Cl.
  CPC .... *H02M 3/335* (2013.01); *H02M 2001/0032* (2013.01); *H02M 2001/322* (2013.01)

(58) Field of Classification Search
  USPC ........ 363/21.12, 21.15–21.16, 21.18, 53, 76, 363/77, 125, 127, 140
  See application file for complete search history.

(56)     References Cited

U.S. PATENT DOCUMENTS

| | | |
|---|---|---|
| 8,164,932 B2 | 4/2012 | Sims et al. |
| 8,664,804 B2 | 3/2014 | Cruz et al. |
| 2001/0013856 A1 | 8/2001 | Hamakada et al. |
| 2006/0022650 A1 | 2/2006 | Vinciarellia |
| 2007/0171683 A1 | 7/2007 | Sukup |
| 2007/0201252 A1 | 8/2007 | Yang et al. |
| 2008/0043504 A1 | 2/2008 | Ye et al. |
| 2010/0002474 A1 | 1/2010 | Moon et al. |

AC-DC VOLTAGE CONVERTER WITH LOW STANDBY POWER CONSUMPTION AND CONTROL METHOD THEREOF

RELATED APPLICATIONS

This application is a continuation of the following application, U.S. patent application Ser. No. 13/950,976, filed on Jul. 25, 2013, and which is hereby incorporated by reference as if it is set forth in full in this specification, and which also claims the benefit of Chinese Patent Application No. 201210309980.4, filed on Aug. 28, 2012, which is incorporated herein by reference in its entirety.

FIELD OF THE INVENTION

The present invention relates to the field of switching power supplies, and more particularly to an AC-DC voltage converter with low standby power consumption, and an associated control method.

BACKGROUND

Switching power supply converters are widely used for converting AC power supplies to DC power supplies. Such power supply converters may utilize capacitors for energy storage. If a common capacitor is employed at a power supply input side of a switching power supply converter, electric charge may remain on the common capacitor for a relatively long time after the AC power supply is off. In some cases, the common capacitor at the input side of the power supply may be replaced by a "safety" capacitor. However, it may be difficult satisfy low standby power consumption requirements when using such a safety capacitor along with related components.

SUMMARY

In one embodiment, an AC-DC voltage converter can include: (i) a safety capacitor configured to receive an input power supply; (ii) a common mode filter inductor configured to process the input power supply with a rectifier bridge and a filter; (iii) a switching power supply circuit configured to receive an output from the filter, where the switching power supply circuit comprises a power stage circuit, a control circuit configured to control the power stage circuit to realize voltage conversion of the input power supply, and a phantom load; (iv) where the control circuit is configured to disable the phantom load when the control circuit detects that the input power supply is operating in a normal operating state; and (v) where when the control circuit detects that the input power supply is operating in an under voltage lock out state, the control circuit is configured to enable the phantom load, energy stored in the safety capacitor is configured to be supplied to a load of the switching power supply circuit and the phantom load, and the power stage circuit is configured to be disabled until a voltage of the safety capacitor is reduced to less than a predetermined threshold value.

In one embodiment, a method of controlling an AC-DC voltage converter can include: (i) detecting operating states of an input power supply, where the input power supply is received by a safety capacitor and provided to a switching power supply circuit after being rectified and filtered; (ii) removing a phantom load when the input power supply is detected as operating in a normal operating state; (iii) loading the phantom load when the input power supply is detected as operating in an under voltage lock out state; and (iv) when the input power supply is detected as operating in the under voltage lock out state, using energy stored in the safety capacitor to supply power to a load of the switching power supply circuit and the phantom load, and disabling a power stage circuit until a voltage of the safety capacitor is reduced to less than a safety threshold value.

Embodiments of the present invention can advantageously provide several advantages over conventional approaches. For example, a relatively simple control circuit method is employed such that a safety capacitor can discharge safely and relatively fast. Also, power consumption and costs can be reduced, and a more compact circuit structure can be realized. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
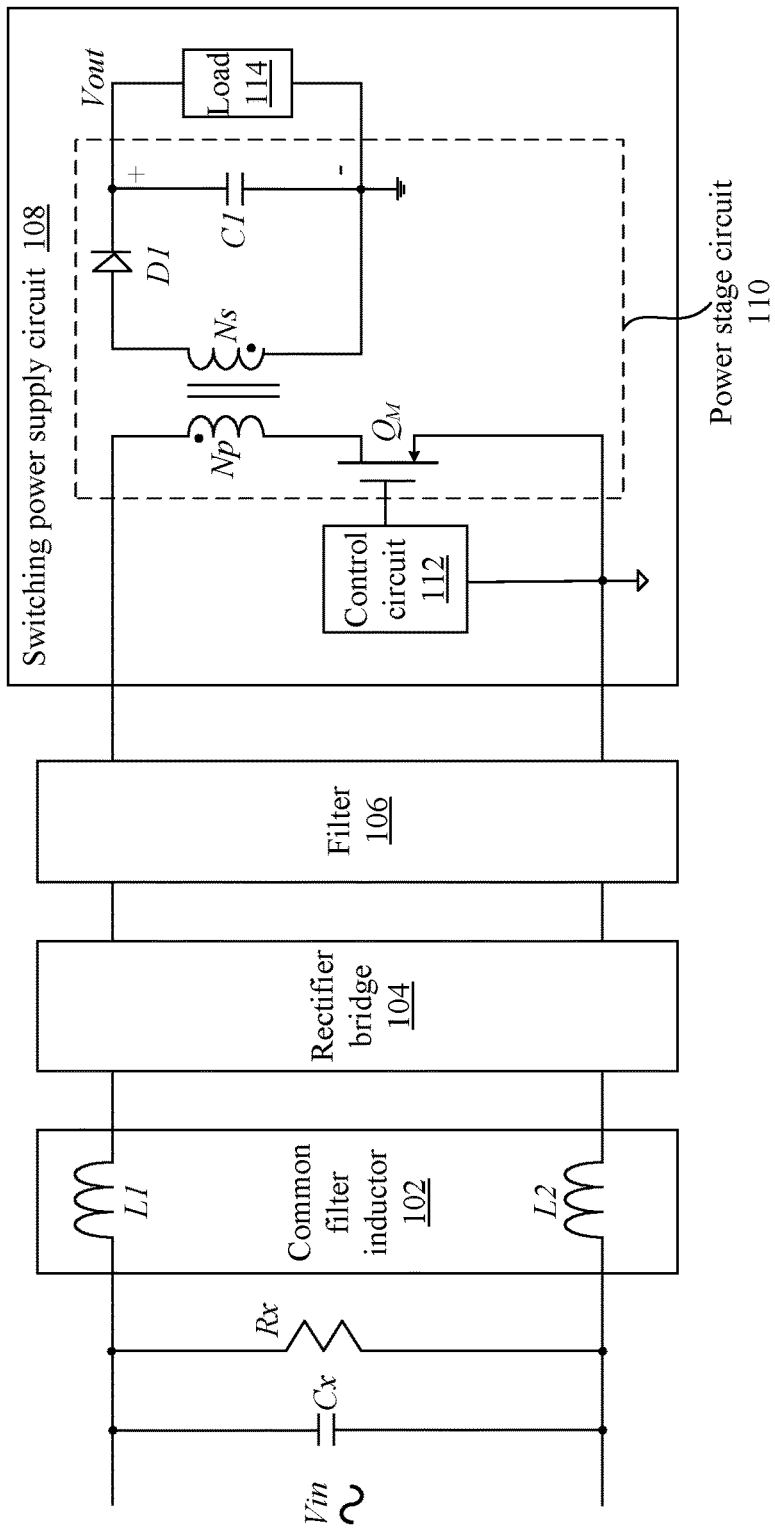
FIG. 1 shows a schematic block diagram of an example isolated switching power supply converter.

Referring now to FIG. 1, shown is a schematic block diagram of an example isolated switching power supply converter. This example isolated switching power supply converter can include safety capacitor Cx, discharge resistor Rx, common mode filter inductor 102, rectifier bridge 104, filter 106, and switching power supply circuit 108. Switching power supply circuit 108 can include power stage circuit 110 and control circuit 112, and may provide DC output Vout to load 114. For example, power stage circuit 110 can employ a flyback topology. A flyback converter can be used in both AC/DC and DC/DC conversion with galvanic isolation between the input and any outputs, thus representing an isolated topology. More precisely, the flyback converter is a buck-boost converter with the inductor split to form a transformer (e.g., with primary winding Np and secondary winding Ns), so that the voltage ratios are multiplied with an additional advantage of isolation.

Control circuit 112 can be used to control main power switch $Q_M$ of power stage circuit 110. After the input power supply of the isolated switching power supply is cut off or otherwise disabled, safety capacitor Cx can discharge in a certain time to satisfy safety requirements. Discharge resistor Rx in FIG. 1 is intended to discharge safety capacitor Cx when the input power supply is off. Although the discharge time of safety capacitor Cx may satisfy safety requirements, discharge resistor Rx may still consume electronic energy when the input power supply is on or otherwise enabled. Thus, even in an empty load condition, it may be difficult to satisfy low standby power consumption requirements.

Figure 2:
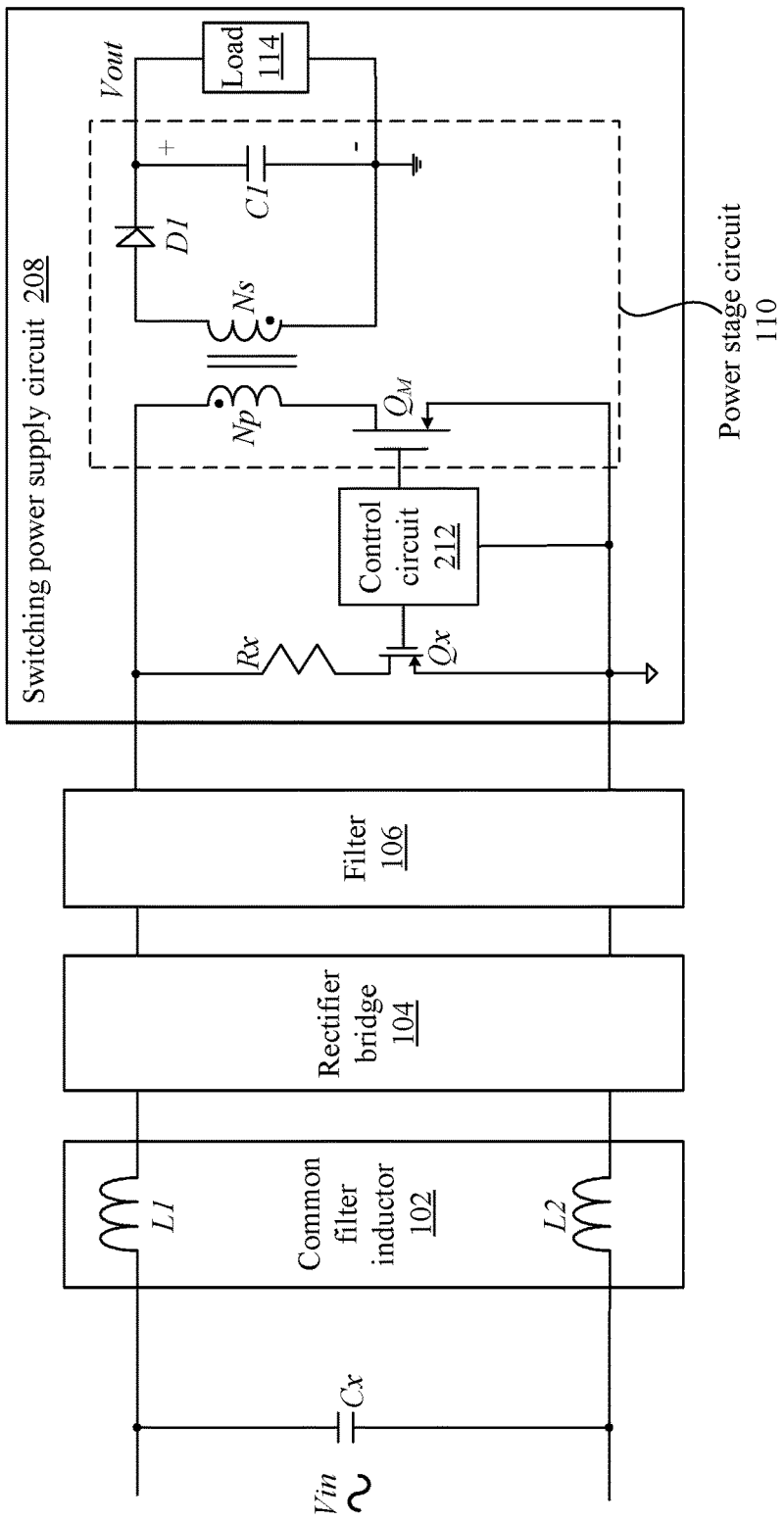
FIG. 2 shows a schematic block diagram of another example isolated switching power supply converter.

Referring now to FIG. 2, shown is a schematic block diagram of another example isolated switching power supply converter. Many elements or circuit blocks may be represented by a same or similar number as in a previous figure, such as control circuit 212 in FIG. 2, as compared to control circuit 112 in FIG. 1. Thus, control circuit 212 may have a same or similar functionality as corresponding control circuit 112, and in some cases may have different circuit implementations or external block configurations. This example isolated switching power supply converter is improved in several respects as compared to the example of FIG. 1. In the example of FIG. 2, another switch Qx is added, and discharge resistor Rx can connect in series with switch Qx. Switch Qx and discharge resistor Rx can be coupled between the DC bus voltage (e.g., input to switching power supply circuit 208) and ground. Also, control circuit 212 can control switch Qx to enable or disable discharge resistor Rx.

In a normal operating state, control circuit 212 may control switch Qx to remain off or disabled, to disallow discharge resistor Rx from consuming extra electronic energy, or sinking current. After determining that the input power supply has been interrupted, control circuit 212 can control switch Qx to turn on to enable discharge resistor Rx to sink current to discharge safety capacitor Cx. However, the "withstand" or breakdown voltage of switch Qx may be about the DC bus voltage (e.g., about 400V). A high withstand voltage switch chosen to be switch Qx increases costs, also may be difficult to integrate in the chip (IC).

In particular embodiments, a relatively simple control circuit method is employed to make safety capacitor Cx discharge safely and relatively fast, to reduce power consumption and costs, and to make a more compact circuit structure. For example, a AC-DC voltage converter with low standby power consumption in particular embodiments can add a "phantom load" in the switching power supply circuit. A phantom load may also be referred to as standby power, vampire power, vampire draw, or leaking electricity, as but a few examples, and generally refers to the electric power consumed by electronic/electrical appliances while being switched off or in a standby mode. In particular embodiments, a phantom load can be controlled to reduce electric energy consumption when the input power supply is operating in a normal operating state by removal (disabling) of the phantom load. In other operating states, control can be such that the phantom load can be loaded (enabled) in order to draw charge from the safety capacitor, along with other circuit controls.

Also in particular embodiments, the withstand voltage of a switch for controlling the phantom load to be loaded or removed may be about the voltage of the auxiliary winding. For example, such a switch withstand voltage can be, e.g., about 12V (as opposed to hundreds of volts), so switch costs can be reduced by selecting a switch with a relatively low withstand voltage. Further, the control circuit may not need an extra external power supply, but rather can obtain electric energy from the power stage through the auxiliary winding. In addition, the low withstand voltage switch and the auxiliary winding for supplying electric energy to the control circuit can be integrated in the chip, thus making the overall circuit more compact. Also, the power stage circuit in the switching power supply circuit can utilize either isolated (e.g., flyback) or non-isolated (e.g., buck) topologies.

In one embodiment, an AC-DC voltage converter can include: (i) a safety capacitor configured to receive an input power supply; (ii) a common mode filter inductor configured to process the input power supply with a rectifier bridge and a filter; (iii) a switching power supply circuit configured to receive an output from the filter, where the switching power supply circuit comprises a power stage circuit, a control circuit configured to control the power stage circuit to realize voltage conversion of the input power supply, and a phantom load; (iv) where the control circuit is configured to disable the phantom load when the control circuit detects that the input power supply is operating in a normal operating state; and (v) where when the control circuit detects that the input power supply is operating in an under voltage lock out state, the control circuit is configured to enable the phantom load, energy stored in the safety capacitor is configured to be supplied to a load of the switching power supply circuit and the phantom load, and the power stage circuit is configured to be disabled until a voltage of the safety capacitor is reduced to less than a predetermined threshold value.

Figure 3:
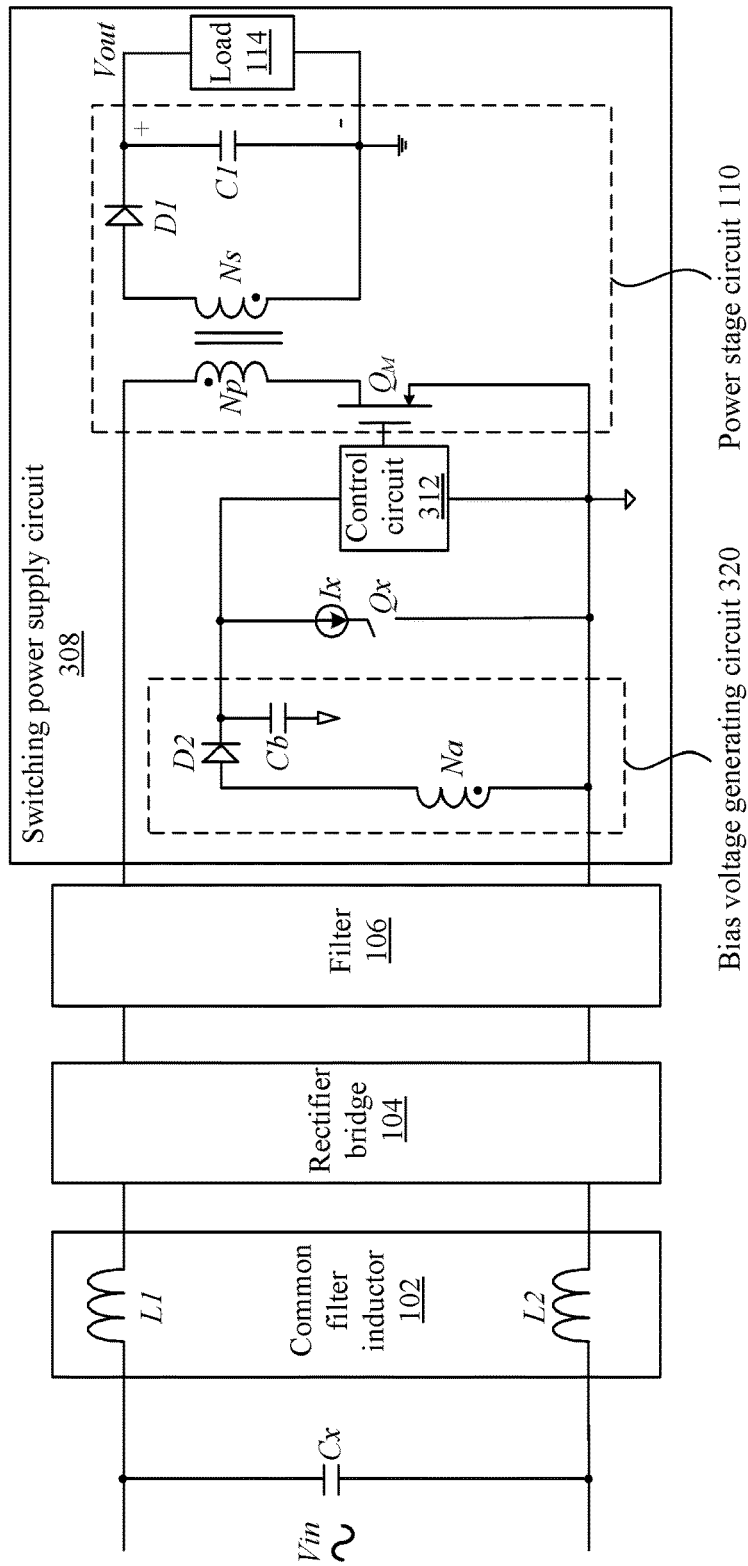
FIG. 3 shows a schematic block diagram of an example AC-DC voltage converter with low standby power consumption, in accordance with embodiments of the present invention.

Referring now to FIG. 3, shown is an example AC-DC voltage converter with low standby power consumption, in accordance with embodiments of the present invention. The AC-DC voltage converter with low standby power consumption can include safety capacitor Cx, common mode filter inductor 102, rectifier bridge 104, filter 106, and switching power supply circuit 308. Safety capacitor Cx can receive external input power supply Vin, and external input power supply Vin can be input to switching power supply circuit 308 via common mode filter inductor 102, rectifier bridge 104, and filter 106. Switching power supply circuit 308 can include power stage circuit 110, control circuit 312, and phantom load Ix. Control circuit 312 can control power stage circuit 110 to realize voltage conversion of input power supply Vin to output power supply Vout.

Control circuit 312 can be used to detect an operating state or mode of input power supply Vin. When input power supply Vin operates in a normal operating state, control circuit 312 can control phantom load Ix to be removed or disabled. Control circuit 312 can control power stage circuit 110 to realize voltage conversion of input power supply Vin to output power supply Vout. However, when input power supply Vin operates in an under voltage lock out state, input power supply Vin is off and may unsuccessfully supply electric energy to power stage circuit 110. An under voltage lock out (UVLO) state can result from a protection system for power converters where the converter is deliberately shut down if the input voltage drops below a pre-defined level. Some hysteresis can be utilized to prevent the converter from oscillating on and off. UVLO can be employed in battery systems where the voltage decreases gradually with time rather than quickly snapping off.

When the under voltage lock out state is detected, control circuit 312 can control phantom load Ix to be loaded to discharge safety capacitor Cx discharge, and to control power stage circuit 110. The electric energy converted by power stage circuit 110 may be the energy stored in safety capacitor Cx. That is, the energy stored in safety capacitor Cx can be supplied to both load 114 of switching power supply circuit 308, and phantom load Ix. With supplementation of phantom load Ix, the discharging speed of safety capacitor Cx can be increased. In this way, safety capacitor Cx can be steadily and quickly discharged, and power stage circuit 110 may stop energy conversion until a voltage of safety capacitor Cx is reduced to less than a safety threshold value.

Switching power supply circuit 308 can also include bias voltage generating circuit 320. Bias voltage generating circuit 320 can include auxiliary winding Na, bias diode D2, and bias capacitor Cb. Auxiliary winding Na can be inductively coupled with primary winding Np of power stage circuit 110 for obtaining electric energy from the power stage circuit. An output terminal of auxiliary winding Na can be coupled with bias diode D2 and bias capacitor Cb as shown. Bias capacitor Cb can connect to ground GND, and the voltage of bias capacitor Cb can be configured as the output voltage of bias voltage generating circuit 320. Also, an output terminal of bias voltage generating circuit 320 can supply electric energy to control circuit 312. Switching power supply circuit 308 can also include switch Qx, and the output terminal of bias voltage generating circuit 320 can be coupled with phantom load Ix through switch Qx.

When control circuit 312 detects that input power supply Vin is operating in a normal operating state, the control circuit can disable switch Qx to remove phantom load Ix. However, when control circuit 312 detects that input power supply Vin is operating in an under voltage lock out state, the control circuit can enable switch Qx for loading the phantom load to discharge safety capacitor Cx. Because both the load of switching power supply circuit 308 and phantom load Ix may consume energy stored in safety capacitor Cx, the voltage of safety capacitor Cx may decrease to less than a safety threshold value. At this time, power stage circuit 110 may stop operating, and as bias voltage generating circuit 320 cannot continuously obtain electric energy from the power stage circuit, the energy stored in bias capacitor Cb can be used to supply the phantom load. This can occur until the voltage of bias capacitor Cb is reduced to less than the safety threshold value, and control circuit 312 is fully turned off.

From the topology of FIG. 3, the withstand voltage (e.g., on the order of dozens of volts) of switch Qx may be the voltage of the auxiliary winding. Thus, a switch with a relatively low withstand voltage can be chosen as switch Qx, to greatly reduce switch costs. Also, control circuit 312 may not need external power supply, but can obtain electric energy from power stage circuit 110 through auxiliary winding Na. Further, both the low withstand voltage switch Qx and the auxiliary winding Na which supplies the electric energy for control circuit 312 can be integrated in a chip, to make the overall circuitry more compact. In addition, phantom load Ix can be implemented by a current source or a resistor. In this particular example, flyback topology isolated can be employed in power stage circuit 110. However, a AC-DC voltage converter of certain embodiments is not limited to the particular topology thereof, and non-isolated topologies can also be employed.

Figure 4:
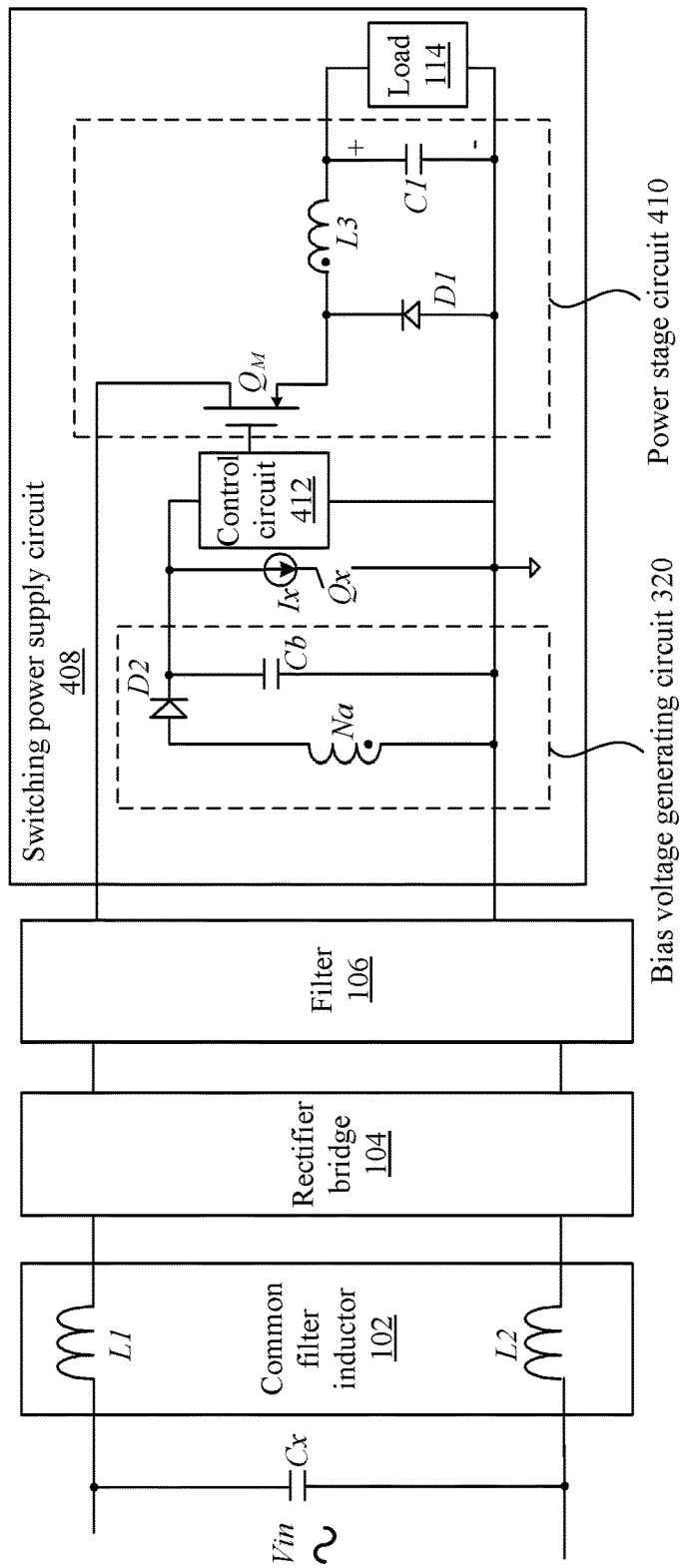
FIG. 4 shows a schematic block diagram of another example AC-DC voltage converter with low standby power consumption, in accordance with embodiments of the present invention.

Referring now to FIG. 4 shown is a schematic block diagram of another example AC-DC voltage converter with low standby power consumption, in accordance with embodiments of the present invention. In this example, a non-isolated buck converter can be utilized in power stage circuit 410. Power stage circuit 410 can include main power switch $Q_M$, inductor L3, rectifier diode D1, and filter capacitor C1. The voltage at the output terminal of filter capacitor C1 can be configured as output voltage Vout of switching power supply circuit 408. Also, control circuit 412 can realize voltage conversion of power stage circuit 410 by controlling the switching operation of main switch $Q_M$.

In particular embodiments, an AC-DC voltage converter with low standby power consumption can utilize an additional phantom load in the switching power supply circuit to reduce electric energy consumption by loading or removing the phantom load based on the particular operating states. While withstand switch voltages for controlling the discharge resistor in conventional approaches may be a DC bus voltage (e.g., on the order of hundreds of volts, such as 300V to 400V), the withstand voltage of a switch for controlling the phantom load in particular embodiments may be a voltage of an auxiliary winding (e.g., on the order of dozens of volts), thus reducing costs. In addition, the control circuit may not need extra external power supply, but can obtain electric energy from the power stage circuit through the auxiliary winding. In addition, both the low withstand voltage switch and the auxiliary winding for supplying electric energy to the control circuit can be integrated in a chip, thus making the overall circuit more compact. Moreover, the AC-DC voltage converter in particular embodiments can be employed in power stage circuits with various topologies (e.g., flyback, buck, etc.).

In one embodiment, a method of controlling an AC-DC voltage converter can include: (i) detecting operating states of an input power supply, where the input power supply is received by a safety capacitor and provided to a switching power supply circuit after being rectified and filtered; (ii) removing a phantom load when the input power supply is detected as operating in a normal operating state; (iii) loading the phantom load when the input power supply is detected as operating in an under voltage lock out state; and (iv) when the input power supply is detected as operating in the under voltage lock out state, using energy stored in the safety capacitor to supply power to a load of the switching power supply circuit and the phantom load, and disabling a power stage circuit until a voltage of the safety capacitor is reduced to less than a safety threshold value.

Figure 5:
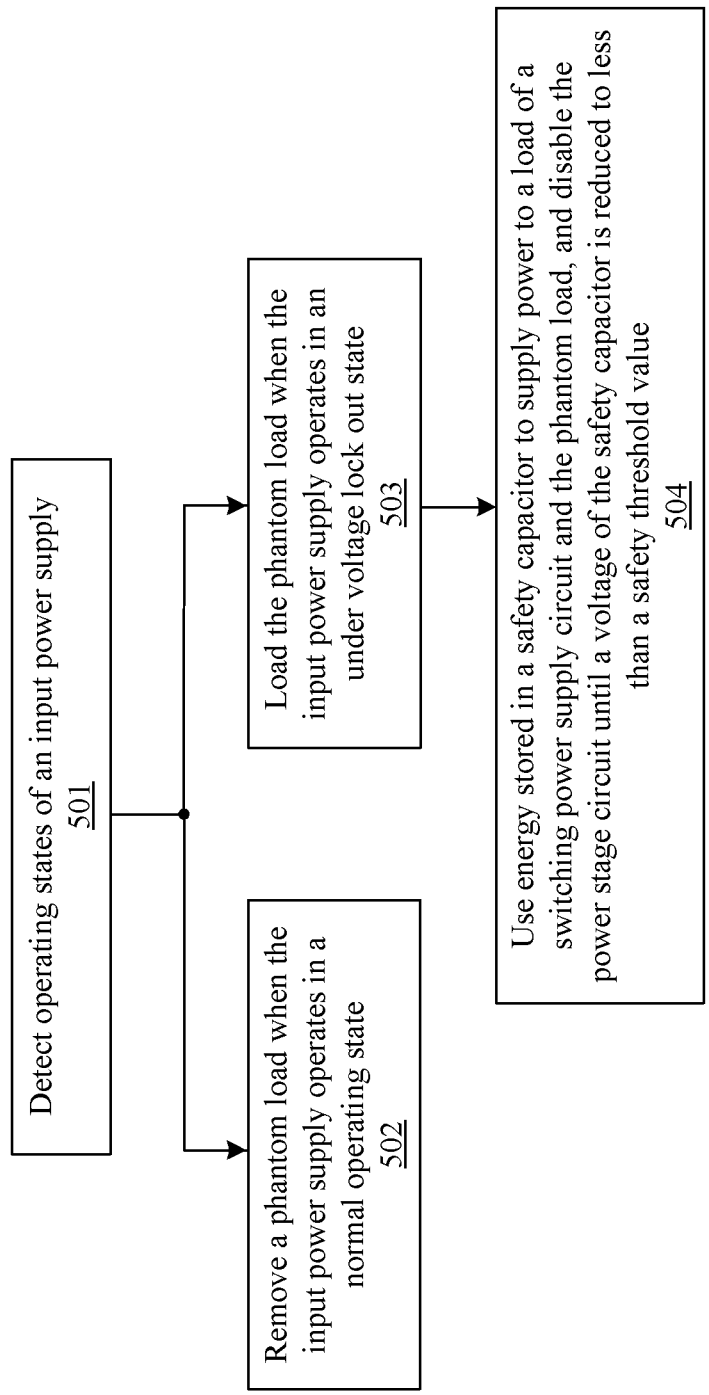
FIG. 5 shows a flow diagram of an example control method of an AC-DC voltage converter with low standby power consumption, in accordance with embodiments of the present invention.

Referring now to FIG. 5, shown is an example control method for an AC-DC voltage converter with low standby power consumption, in accordance with embodiments of the present invention. For example, a safety capacitor can receive an input power supply, and the input power supply can be input to the switching power supply circuit after being rectified and filtered. Also, the voltage circuit of the power supply circuit can realize voltage conversion of the input power supply by controlling the power stage circuit of the switching power supply circuit, as discussed above.

At 501, the operating state of the input power supply can be detected. For example, a control circuit (e.g., 312, 412) can be utilized to determine such an operating state, and may be based on a detected voltage and/or current that is related to the input power supply. At 502, a phantom load can be removed (e.g., by turning off or disabling a switch) when the input power supply is detected as operating in a normal operating state. At 503, the phantom load can be loaded or enabled (e.g., by turning on or enabling a switch) when the input power supply is detected as operating in an under voltage lock out state.

At 504, the stored energy of the safety capacitor can be used to supply power for both the load of the switching power supply circuit and the phantom load. Also, the power stage circuit can be disabled until the voltage of the safety capacitor is reduced to less than a safety threshold value. Also, when the voltage of the safety capacitor is reduced to be less than the safety threshold value, energy stored in a bias capacitor can be supplied to the phantom load until the control circuit is disabled after the power stage circuit is disabled.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An AC-DC voltage converter, comprising:
   a) a safety capacitor configured to receive an input power supply;
   b) a common mode filter inductor coupled to said safety capacitor, and being configured to process said input power supply with a rectifier bridge and a filter;
   c) a switching power supply circuit configured to receive an output from said filter, wherein said switching power supply circuit comprises a power stage circuit, a control circuit configured to control said power stage circuit to achieve voltage conversion of said input power supply, and a pseudo load;
   d) wherein said control circuit is configured to disable said pseudo load from a supply voltage of said control circuit by opening a first switch connected to said pseudo load when said input power supply is operating in a normal operating state; and
   e) wherein when said input power supply is operating in an under voltage lock out state, said control circuit is configured to enable said pseudo load, energy stored in said safety capacitor is configured to be discharged to a load of said switching power supply circuit and said pseudo load, and said pseudo load is enabled by said first switch in order to increase the discharging speed of said safety capacitor.

2. The AC-DC voltage converter of claim 1, further comprising a bias voltage generating circuit configured to provide a supply voltage to said control circuit.

3. The AC-DC voltage converter of claim 2, wherein said switching power supply circuit comprises:
   a) said first switch coupled in series with said pseudo load between the output terminals of said bias voltage generating circuit;
   b) wherein said control circuit is configured to turn off said first switch when said input power supply is operating in said normal operating state; and
   c) wherein said control circuit is configured to turn on said first switch load when said input power supply operates in said under voltage lock out state.

4. The AC-DC voltage converter of claim 3, wherein said energy stored in said bias capacitor is configured to be supplied to said pseudo load until said control circuit is disabled after said power stage circuit is disabled.

5. The AC-DC voltage converter of claim 2, wherein said power stage circuit is disabled by said control circuit when said supply voltage is less than a limit value.

6. The AC-DC voltage converter of claim 2, wherein said power stage circuit is disabled by said control circuit after a voltage of said safety capacitor is less than a safety threshold value.

7. The AC-DC voltage converter of claim 2, wherein said bias voltage generating circuit comprises:
   a) an auxiliary winding coupled with an inductor of said power stage circuit; and
   b) a bias diode and a bias capacitor coupled in series between two terminals of said auxiliary winding, wherein said bias capacitor is configured to provide said supply voltage to said control circuit.

8. The AC-DC voltage converter of claim 7, wherein a withstand voltage of said first switch is about a voltage across said auxiliary winding.

9. The AC-DC voltage converter of claim 1, wherein said pseudo load comprises a current source.

10. The AC-DC voltage converter of claim 1, wherein said under voltage lock out state comprises said input power supply being less than a pre-defined level.

11. The AC-DC voltage converter of claim 1, wherein said pseudo load comprises a resistor.

12. A method of controlling an AC-DC voltage converter, the method comprising:
    a) detecting, by a control circuit, operating states of an input power supply, wherein said input power supply is received by a safety capacitor and provided to a switching power supply circuit after being rectified and filtered, wherein said safety capacitor is coupled to a common mode filter inductor, and said switching power supply circuit comprises a power stage circuit;
    b) removing a pseudo load from a supply voltage of said control circuit by opening a first switch connected to said pseudo load when said input power supply is detected as operating in a normal operating state;
    c) loading said pseudo load when said input power supply is detected as operating in an under voltage lock out state; and
    d) when said input power supply is detected as operating in said under voltage lock out state, discharging energy stored in said safety capacitor to supply power to a load of said switching power supply circuit and said pseudo load, and enabling said pseudo load by said first switch in order to increase the discharging speed of said safety capacitor.

13. The method of claim 12, wherein said switching power supply circuit comprises said control circuit for controlling said power stage circuit to achieve voltage conversion of said input power supply.

14. The method of claim 13, further comprising:
    a) turning off said first switch to remove said pseudo load when said control circuit detects that said input power supply is operating in said normal operating state; and
    b) turning on said first switch to load said pseudo load when said control circuit detects that said input power supply is operating in said under voltage lock out state.

15. The method of claim 12, further comprising using a bias voltage generating circuit to supply power to said pseudo load until said control circuit is disabled after a power stage circuit is disabled.

16. The method of claim 15, wherein said bias voltage generating circuit comprises:
    a) an auxiliary winding coupled with an inductor of said power stage circuit;
    b) a bias diode coupled to an output of said auxiliary winding; and c) a bias capacitor that provides a supply voltage to said control circuit.

17. The method of claim 16, wherein a withstand voltage of said first switch is about a voltage across said auxiliary winding.

18. The method of claim 12, further comprising using a bias voltage generating circuit to supply power to said control circuit.

19. The method of claim 12, wherein said pseudo load comprises a current source.

20. The method of claim 12, wherein said pseudo load comprises a resistor.

* * * * *